US010656240B2

(12) United States Patent
Furman et al.

(10) Patent No.: US 10,656,240 B2
(45) Date of Patent: May 19, 2020

(54) HYBRID TDOA CLOSED FORM HYPERBOLIC AND SPHERICAL ITERATION GEO-LOCATION TECHNIQUE

(71) Applicant: HARRIS CORPORATION, Melbourne, FL (US)

(72) Inventors: William N. Furman, Fairport, NY (US); John W. Nieto, Rochester, NY (US); Paul E. Voglewede, Chile, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 323 days.

(21) Appl. No.: 15/252,949

(22) Filed: Aug. 31, 2016

(65) Prior Publication Data

US 2018/0059211 A1   Mar. 1, 2018

(51) Int. Cl.
*G01S 5/06* (2006.01)
*G01S 5/02* (2010.01)

(52) U.S. Cl.
CPC .............. *G01S 5/06* (2013.01); *G01S 5/0252* (2013.01)

(58) Field of Classification Search
CPC ........ G01S 5/06; G01S 5/0252; G01S 5/0263; G01S 19/48; G01S 5/10; G01S 5/14; H04W 64/00
See application file for complete search history.

(56) References Cited

U.S. PATENT DOCUMENTS

| | | | | |
|---|---|---|---|---|
| 5,890,068 A | * | 3/1999 | Fattouche | G01S 5/06 342/457 |
| 5,960,355 A | * | 9/1999 | Ekman | G01S 5/10 455/456.1 |
| 6,021,330 A | * | 2/2000 | Vannucci | H04W 64/00 342/457 |
| 2001/0051526 A1 | * | 12/2001 | Ruutu | H04W 64/00 455/456.6 |

(Continued)

FOREIGN PATENT DOCUMENTS

WO   WO-2012016355 A1 * 2/2012 ............... G01S 5/10

OTHER PUBLICATIONS

European Search Report for EP 17001280, dated Jan. 29, 2018 (Year: 2018).*

(Continued)

*Primary Examiner* — Bernarr E Gregory
*Assistant Examiner* — Fred H Mull
(74) *Attorney, Agent, or Firm* — Fox Rothschild LLP; Robert J. Sacco; Carol E. Thorstad-Forsyth

(57) ABSTRACT

Determining a signal emitter location involves receiving a signal of interest (SOI) at detection devices, generating a time stamp corresponding to the arrival of the SOI at each detection device, and communicating digital data samples and the time stamp to a time-difference of arrival (TDOA) computer system. The TDOA computer system determines a TDOA of the SOI at the detection devices relative to an arrival time at a first one of the detection devices having an earliest time stamp. It determines a first solution to identify the emitter location in accordance with a first TDOA solution method. It evaluates the reliability of the first solution and selectively uses a second solution if the first solution is insufficiently reliable.

15 Claims, 12 Drawing Sheets

(56) References Cited

U.S. PATENT DOCUMENTS

| | | | | |
|---|---|---|---|---|
| 2002/0045455 A1* | 4/2002 | Spratt | ............... | G01S 1/045 |
| | | | | 455/456.1 |
| 2003/0176196 A1* | 9/2003 | Hall | ............... | G01S 5/0205 |
| | | | | 455/456.1 |
| 2010/0138147 A1* | 6/2010 | T'Siobbel | ............ | G01S 5/0263 |
| | | | | 701/533 |
| 2012/0327922 A1* | 12/2012 | Takahashi | ............ | G01S 5/0263 |
| | | | | 370/338 |
| 2013/0137450 A1* | 5/2013 | Dai | ............... | G01S 19/48 |
| | | | | 455/456.1 |
| 2014/0163357 A1* | 6/2014 | Higaki | ............... | G01S 5/14 |
| | | | | 600/424 |
| 2018/0077529 A1* | 3/2018 | Ryu | ............... | G01S 5/0263 |

OTHER PUBLICATIONS

European Search Opinion for EP 17001280, dated Jan. 29, 2018 (Year: 2018).*

SA Stotts et al., Multiple-source localization using GPS technology and received arrival time structure analysis in an air-deployed system, IEEE Journal of Oceanic Engineering, vol. 22(3), p. 576-582, Jul. 1997 (Year: 1997).*

Defintion of substance. (2014). Collins English Dictionary (12th ed.). London, UK: Collins. Retrieved from https://search.credoreference.com/content/entry/hcengdict/substance/0 (Year: 2014).*

* cited by examiner

HYBRID TDOA CLOSED FORM HYPERBOLIC AND SPHERICAL ITERATION GEO-LOCATION TECHNIQUE

BACKGROUND OF THE INVENTION

Statement of the Technical Field

The inventive arrangements relate to geo-location systems and more particularly to geo-location systems based on radio signal time-difference of arrival as determined at a plurality of radio receivers.

Description of the Related Art

A plurality of communications radio receivers comprising a detection network can concurrently collect radio frequency (RF) samples of target signals of interest (SOIs) and determine a geo-location of a corresponding transmission source or emitter based on a time difference of arrival (TDOA) of such signals at the various radio receivers. In order for such systems to work, radio receivers at a minimum of three different locations are required. The presence of additional radio receivers at additional location is not necessary but can be advantageous for improving accuracy of the RF emitter location estimation.

In a conventional TDOA system, digital data samples associated with the SOI are time stamped when received at each of the radio receivers. The digital data samples and the time stamp information from each radio receiver are then communicated to a processing location where a cross-correlation is performed upon the digital data samples to determine timing offsets. This information together with the time stamp information is then used so as to obtain a precise measure of the relative time difference of arrival of such signals at each of the radio receivers. It will be appreciated that the foregoing process requires a highly accurate time reference for time stamping the digital data samples at each receiver. The time reference can be a clock time maintained at each receiver based on a highly accurate time reference. For example, it is known that the clock time at each receiver can be derived from an external reference, such as GPS signals. Alternatively, the clock time can be derived from a highly accurate local clock (such as a chip-scale atomic clock). Thereafter, using the TDOA information, a set of hyperbolic equations is used to determine an approximate location of the emitter or source of the radio transmission.

Current state of the art systems rely on various solutions of the hyperbolic equations that define the lines of constant delay in an RF propagating environment. These systems offer varying degrees of accuracy and varying amounts of processing time to compute a solution. Still, it can be difficult to finding a solution to estimate geo-location based on TDOA that is both accurate and fast. In many instances, the problem itself can be ill-defined based on estimation error. In some scenarios, the problem can have a singular solution based on geometry of the communication/sensor radios. Accordingly, the required mathematics and associated processing necessary for computing a geo-location solution in a particular instance can vary widely.

SUMMARY OF THE INVENTION

Embodiments of the invention concern a system and method for determining an emitter location from which a radio frequency (RF) transmission originated. The system includes a plurality of detection devices distributed among a plurality of diverse geographic locations. Each detection device includes a radio receiver configured for receiving the RF transmission and a clock configured to determine a time value. At least one processing circuit at each detection device is arranged to record a time stamp information corresponding to a time when at least one digital data sample associated with a signal of interest (SOI) is generated at the detection device. Further, each detection device includes a transmitter to facilitate communicating of the at least one digital data sample and the time stamp information from two or more of the plurality of detection devices to at least one time-difference of arrival (TDOA) computer system.

The TDOA computer system is configured to determine the emitter location by determining a TDOA information for the SOI at each of two or more of the plurality of detection devices relative to a reference one of the detection devices. It does so by calculating a first solution to determine the emitter location in accordance with a first TDOA solution method. It then evaluates the reliability of the first TDOA solution in relation to a performance threshold. It then selectively uses a second solution to determine the emitter location in accordance with a second solution method if the first solution is determined to be insufficiently reliable.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. However, the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Figure 1:
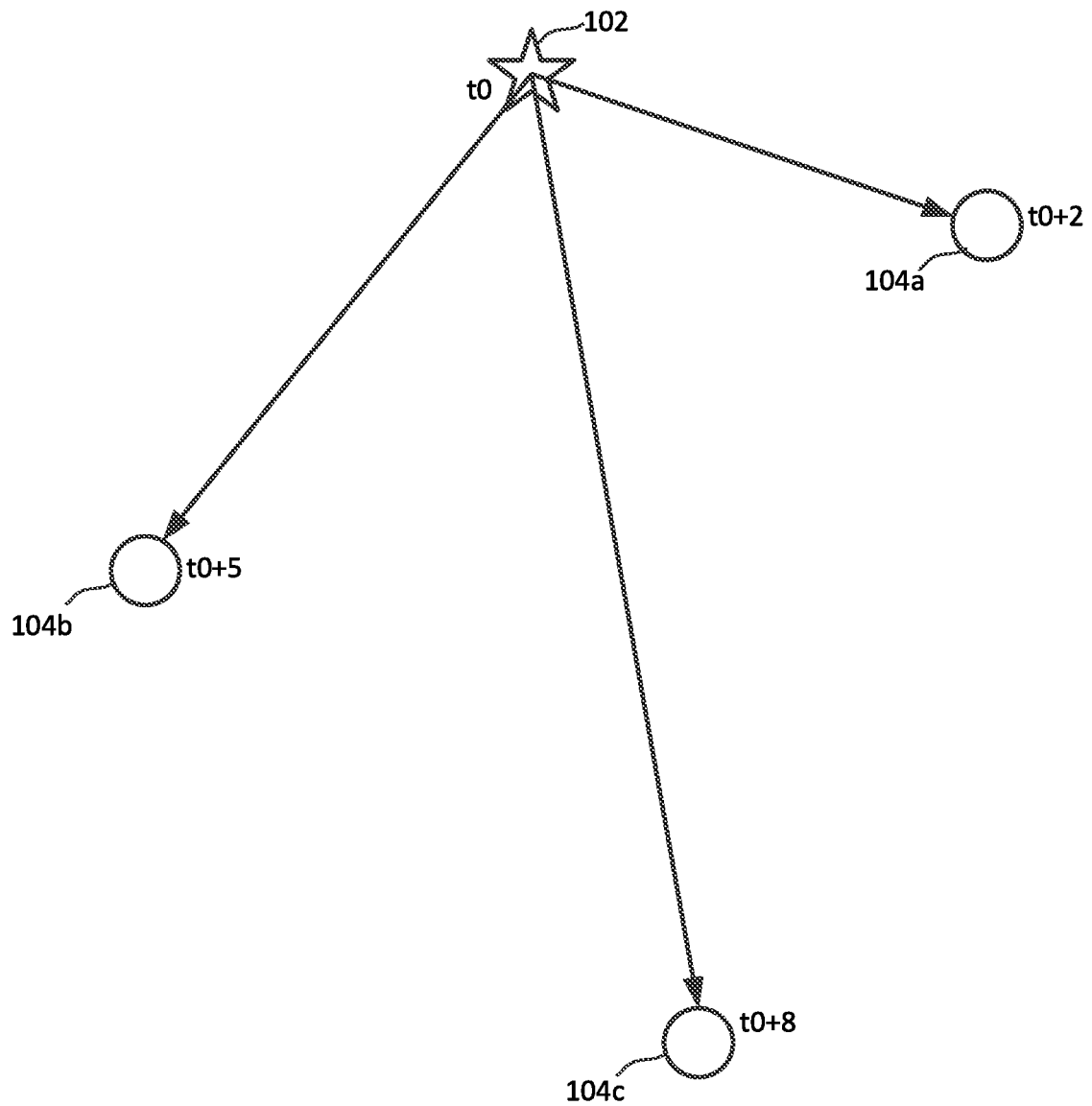
FIG. 1 is a conceptual diagram that is useful for understanding a process for estimating a location of an emitter of an RF signal using an algorithm based on time distance of arrival information.

The inventive arrangements concern a hybrid TDOA based geo-location method and system which combines multiple solutions for optimal overall performance. The method involves receiving from an RF emitter 102 a radio frequency (RF) signal of interest (SOI) at a plurality of detection devices 104a, 104b, and 104c as shown in FIG. 1. Each of the detection devices will include a suitable antenna and radio receiver which is capable of receiving the signal the SOI. The methods described herein generally require use of at least three detection devices 104a, 104b, and 104c to obtain an accurate result. Accordingly, three detection devices are shown in the example illustrated in FIG. 1. However, it should be appreciated that the invention is not limited in this regard and more detection devices are possible.

The SOI will originate from an emitter 102 comprising an antenna/transmitter combination having an unknown geographic location. The detection devices 104a, 104b, 104c are distributed among a plurality of diverse geographic locations. However, the location of the detection devices 104a, 104b, 104c can be known. For example a location determining component, such as a GPS receiver, can be advantageously provided at each detection device so that each detection device is capable of determining its own geo-location. Such an arrangement can be advantageous when the detection devices are mobile and their position is changing frequently. Alternatively, in a scenario where the location of each detection device is fixed, such location can be precisely determined in advance by any suitable means, such that a GPS receiver may not be required in each detection device. In such scenarios, the location information can be stored in a memory or data store accessible by the detection device and/or TDOA computer processing system.

The SOI will have a transmission time when it is transmitted from emitter 102. In FIG. 1, this transmission time is designated as time t0. In the example shown in FIG. 1, the SOI arrives at a first detection device 104a at a later time t0+2. Similarly, the SOI arrives at a second detection device 104b at a time t0+5 and at third detection device 104c at time t0+8. When the SOI is received at each detection device, a time stamp for the SOI is applied or recorded with respect to digital data samples for the SOI at that device. The time stamp is based on the SOI time of arrival at the particular device. Accordingly, in the exemplary embodiment shown in FIG. 1, the detection devices 104a, 104b, 104c would respectively apply time stamps corresponding to t0+2, t0+5 and t0+8.

Subsequently, processing operations are performed by a processing circuit in at least one TDOA computer system to determine a location of the source or emitter of the SOI. In some scenarios, the TDOA computer system where such emitter location processing is performed can include one or more of the detection devices 104a, 104b, and 104c. To facilitate such processing operations, each of the detection devices can share digital data samples of the detected signals and their associated time stamp information with the TDOA computer system and/or the other detection devices. For example, two or more of the detection devices 104a, 104b, and 104c can include a transmitter which communicates the digital data samples and time stamp information using a wired or wireless transmission method. Likewise a receiving system (which may be the same as the receiver system used to receive the SOI) can be provided in at least one of the detection devices 104a, 104b, and 104c for receiving the digital data samples and time stamp information from the other detection devices. Accordingly at TDOA computer system and/or at least one of the detection devices can have access to the digital data samples and time stamp information from each of the detection devices which received the SOI. The processing operations described herein for determining the location of the RF emitter or transmission source can be performed at a single TDOA computer system and/or a single detection device 104a, 104b, and 104c. However, in some scenarios, it can be desirable for each of the detection devices 104a, 104b, 104c to perform similar processing operations so that emitter location results can be calculated at each detection device.

Figure 2:
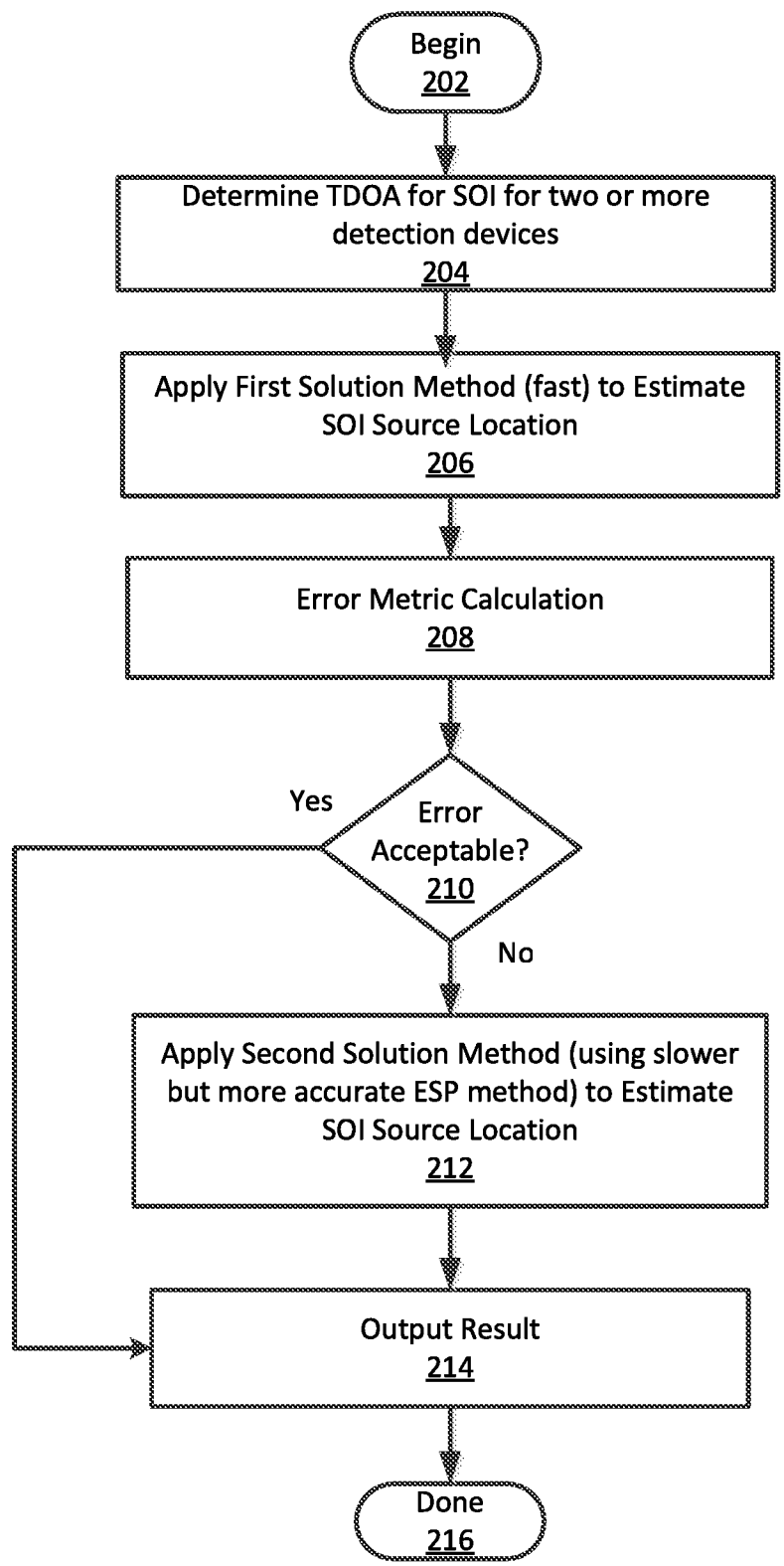
FIG. 2 is a flowchart that is useful for understanding a hybrid process for estimating a location of an RF signal emitter.

Referring now to FIG. 2, the process of determining the source location begins at 202 and continues to 204 where a time difference of arrival (TDOA) is determined for the SOI at two or more of the detection devices. This process involves a cross-correlation process and the use of the time stamp information. Signals from each radio receiver are cross-correlated (either in the time domain or in the frequency domain) to determine relative timing differences, after which these differences are further adjusted by using the time stamp information. The process allows the time of arrival of the digital data samples obtained from each detection device to be compared with the digital data samples from other detection devices so as to obtain a precise measure of the relative time difference of arrival between them. The use of time stamps and cross-correlation of signals received at two different radio receivers is a well-known and commonly used signal processing technique for measuring the relative time delay (TDOA); therefore the process will not be described here in detail. However, it should be noted that, the TDOA information can be determined relative to an arrival time of the SOI at a first one of the detection devices having an earliest time stamp. For example, in FIG. 1 the time difference of arrival of the SOI as between devices 104a and 104c is $T_{AC}=6$. Similarly, the time difference of arrival of the SOI as between devices 104a and 104b is $T_{AB}=3$.

Once the TDOA information has been determined, the computer processor associated with a detection device and/or a central TDOA computer system performs additional processing to generate a first solution 206 involving an estimate or determination of the RF emitter location based on the TDOA information. The first solution is calculated or obtained in accordance with a first solution method. The first solution is advantageously selected so that it can achieve a solution result very rapidly. In an embodiment, such a solution can involve a closed-form solution of quasi-hyperbolic equations which is discussed below in greater detail. But in many instances, such a solution may not provide sufficient accuracy under all conditions. Accordingly, an error metric is calculated at 208 to determine whether the first solution result has provided a satisfactory result under a given set of conditions. The error metric is advantageously chosen so that its calculation involves only a minimal number of processing operations so that the error metric result can be obtained very rapidly.

The calculated error metric is then evaluated or compared at 210 to a threshold value to determine if the results using the first solution are satisfactory or acceptable. This threshold value can be set in advance as a predetermined value. However, the invention is not limited in this regard and a variable threshold value can also be used for such purposes. For example, the variable threshold value can be determined based on one or more measured communication conditions. If the results of using the first solution are satisfactory (210: Yes), the results according to the first solution can be output at 214 as the emitter location result for the received SOI. The output can be presented to the user (e.g. presented on a user display) or can be stored for subsequent use. If the error metric does not satisfy the threshold requirement or is otherwise found to be unacceptable (210: No), then a second solution method is used in 212 to determine or estimate the emitter or source location for the SOI.

The second solution method is advantageously chosen so that it offers greater accuracy as compared to the first solution method. According to one aspect, a process that can be used for this purpose is one based on a geometric visualization of circles (for two-dimensional solution) or spheres (for three-dimensional solution) expanding from the known locations of the detection devices at a uniform rate, wherein the initial sphere radii are set based on the TDOA information. Given accurate TDOA measurements, all sphere edges will converge at the location of the transmission source. This process is referred to herein as Expanding Spherical Positioning (ESP) and is described below in greater detail. The second solution method described herein will inevitably involve a greater number of processing operations, but will provide a significantly more accurate result. Once the location result for the emitter 102 has been determined using the second solution method, the result is output or presented to the user as the emitter location solution for the SOI at 214. Thereafter, the process can terminate at 216 or continue with other processing.

As noted above, a first solution method which is relatively fast can comprise a closed-form solution of quasi-hyperbolic equations. Solutions of this kind are known in the art. For example, such a solution method is disclosed in detail in E. G. Bakhoum, "Closed-form solution of hyperbolic geolocation equations," in IEEE Transactions on Aerospace and Electronic Systems, vol. 42, no. 4, pp. 1396-1404, October 2006. The solution presented in Bakhoum is based on a transformation of the hyperbolic equations applied in a conventional TDOA problem to a set of vector equations. The solution does not require calculation of any range data and does not depend on information other than the time of arrival of the SOI at the detection devices. Bakhoum develops the following three linearly independent equations which represent the closed form solution of the TDOA problem for N+2 detection devices (where N=3 is the number of dimensions):

$$\frac{1}{(t_2-t_1)}\left(\frac{|\vec{P}_2|^2}{\alpha_2^2}-\frac{|\vec{P}_1|^2}{\alpha_1^2}\right)-\frac{1}{(t_3-t_1)}\left(\frac{|\vec{P}_3|^2}{\alpha_3^2}-\frac{|\vec{P}_1|^2}{\alpha_1^2}\right)+ \quad (1)$$

$$c^2(t_3-t_2)=\left[\frac{2}{(t_2-t_1)}\left(\frac{\vec{P}_2^T}{\alpha_2^2}-\frac{\vec{P}_1^T}{\alpha_1^2}\right)-\frac{2}{(t_3-t_1)}\left(\frac{\vec{P}_3^T}{\alpha_3^2}-\frac{\vec{P}_1^T}{\alpha_1^2}\right)\right]\vec{P}_0$$

$$\frac{1}{(t_2-t_1)}\left(\frac{|\vec{P}_2|^2}{\alpha_2^2}-\frac{|\vec{P}_1|^2}{\alpha_1^2}\right)-\frac{1}{(t_4-t_1)}\left(\frac{|\vec{P}_4|^2}{\alpha_4^2}-\frac{|\vec{P}_1|^2}{\alpha_1^2}\right)+ \quad (2)$$

$$c^2(t_4-t_2)=\left[\frac{2}{(t_2-t_1)}\left(\frac{\vec{P}_2^T}{\alpha_2^2}-\frac{\vec{P}_1^T}{\alpha_1^2}\right)-\frac{2}{(t_4-t_1)}\left(\frac{\vec{P}_4^T}{\alpha_4^2}-\frac{\vec{P}_1^T}{\alpha_1^2}\right)\right]\vec{P}_0$$

$$\frac{1}{(t_2-t_1)}\left(\frac{|\vec{P}_2|^2}{\alpha_2^2}-\frac{|\vec{P}_1|^2}{\alpha_1^2}\right)-\frac{1}{(t_5-t_1)}\left(\frac{|\vec{P}_5|^2}{\alpha_5^2}-\frac{|\vec{P}_1|^2}{\alpha_1^2}\right)+ \quad (3)$$

$$c^2(t_5-t_2)=\left[\frac{2}{(t_2-t_1)}\left(\frac{\vec{P}_2^T}{\alpha_2^2}-\frac{\vec{P}_1^T}{\alpha_1^2}\right)-\frac{2}{(t_5-t_1)}\left(\frac{\vec{P}_5^T}{\alpha_5^2}-\frac{\vec{P}_1^T}{\alpha_1^2}\right)\right]\vec{P}_0$$

where:

$t_i$ is the time of arrival at a detection device i;

$\vec{P}_i=(X_i, Y_i, Z_i)$ is the three-dimensional position vector of the receiving antenna of a detection device i;

$\vec{P}_0=(X_0, Y_0, Z_0)$ is the three-dimensional position vector of the RF emitter; and $\alpha_1, \alpha_2, \alpha_3, \alpha_4$, and $\alpha_5$, are unknown coefficients that are less then unity.

As explained in Bakhoum, the simultaneous equations (1), (2) and (3) can be written in the alternative standard algebraic form $$a_{11}X_0+a_{12}Y_0+a_{13}Z_0=b_1$$

$$a_{21}X_0+a_{22}Y_0+a_{23}Z_0=b_2$$

$$a_{31}X_0+a_{32}Y_0+a_{33}Z_0=b_3. \quad (4)$$

The three simultaneous equations (4) are an equation of a plane, and the intersection of the three planes will correspond to a single point which defines the SOI emitter location. So it will be appreciated that the equations (1), (2) and (3) represent a closed-form solution of the TDOA problem described herein and can be easily solved using a conventional mathematical treatment.

While the foregoing represents one example of, a first solution method which is relatively fast, embodiments are not necessarily limited in this regard. Other fast solution methods now known or known in the future can also be used for this purpose.

The second solution method (ESP method) will now be disclosed in greater detail with reference to the flowchart in FIGS. 3A and 3B, and FIGS. 4-7 which illustrate an example based on the scenario shown in FIG. 1. To facilitate understanding, the ESP method shall be illustrated in FIG. 4-7 in two-dimensions. However, it should be appreciated that the same concepts can be applied when seeking a location of a transmission source in three dimensions. Accordingly, the various embodiments can facilitate the identification of transmission source locations in two-dimensions and/or in three-dimensions.

The process begins at 302 and continues in 306 wherein a coarse set of M grid points 500$_{1,1}$ . . . 500$_{i,n}$ are defined in accordance with a coarse grid pattern. As best understood with reference to FIG. 5, each grid point represents a geo-location where the RF emitter might be located relative to the detection devices 104a, 104b, 104c. In some embodiments the grid points can be defined so that they are periodically arranged in alignment along equally spaced parallel rows and columns. Still, other grid patterns are also possible and embodiments are not limited in this regard. The geo-locations of the grid points may be conceptualized as being overlaid upon the geographic locations of the detection devices 104a, 104b, and 104c and the SOI emitter 102 as shown.

The process continues with an evaluation in step 308 which involves determining or calculating for each of the M grid points a minimum total distance error metric. This error metric will be described below in further detail, but may be understood as comprising a measure of how well a particular grid point performs as a potential solution to the TDOA emitter location problem.

The initial set of M grid points is arranged in accordance with a relatively coarse grid whereby each of the grid points is separated by a relatively large distance (e.g. 1,000 meters). Accordingly, it is unlikely that any of the M grid points will actually be an optimal solution to the TDOA problem. However, the results from step 308 can be evaluated in steps 310 and 312 to determine if any of the M grid points provides a satisfactory solution. This can involve identifying in step 310 one of the M grid points having the lowest minimum total distance error, and then determining in 312 whether that grid point has a minimum total distance error which is less than a threshold value. The threshold value can be set as a predetermined value and/or may be dynamically varied in accordance with one or more conditions. If the minimum total error distance error metric is less than the threshold value (312: Yes) then the location of that particular point can be output in step 328. However, in most instances, the process will not yet converge on a suitable solution (312: No) and will therefore continue on to step 314.

Figure 6:
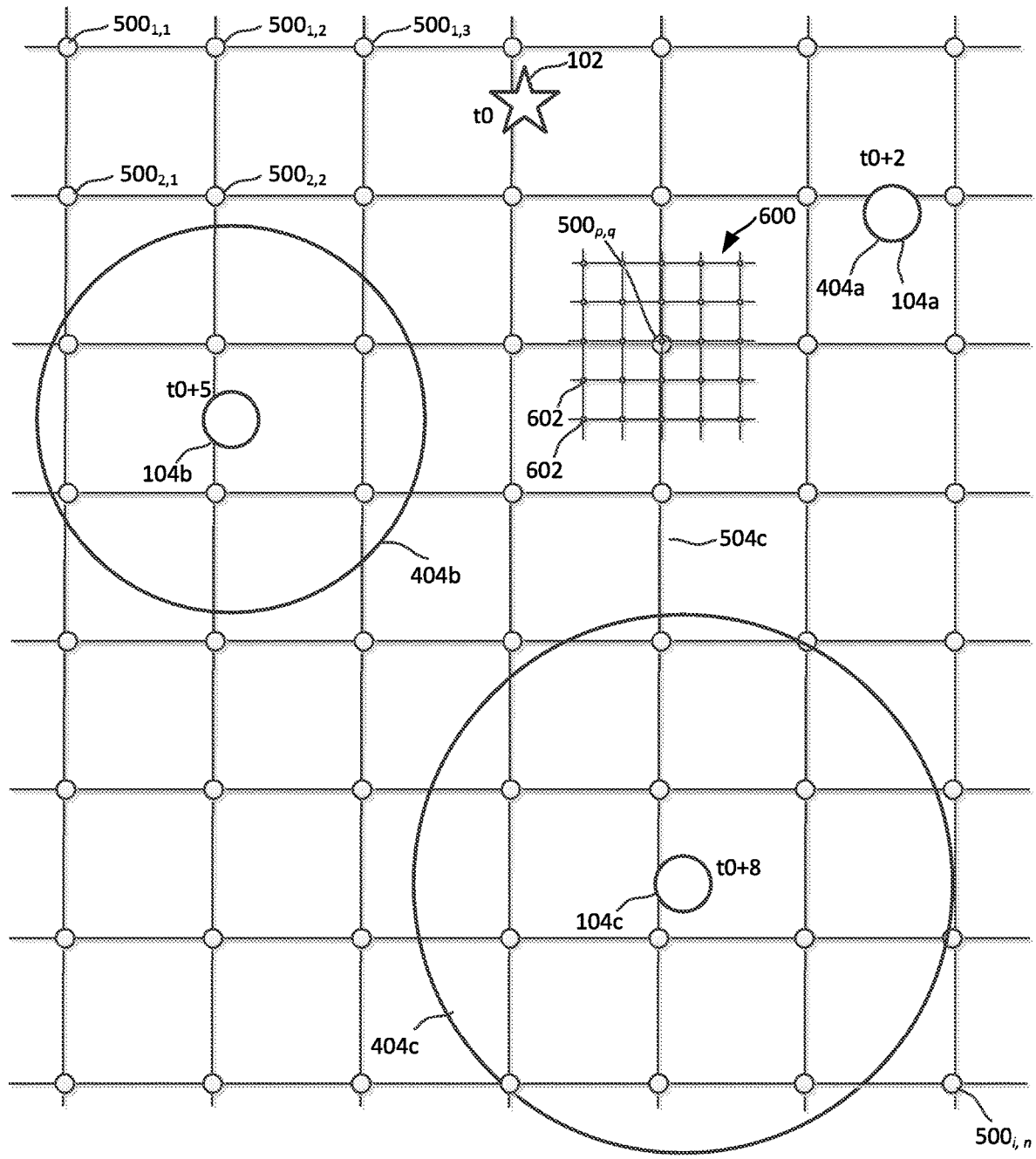
FIG. 6 is a third conceptual diagram that is useful for understanding an ESP method for determining for determining a location of an RF emission source.

At 314, the process continues by selecting a subset of N points from among the M grid points. The subset is comprised of those N points which are calculated to have lowest minimum total distance error, and therefore appear to represent the best possible solutions to the TDOA location problem among all M grid points evaluated. Multiple points are selected at this step because it is possible that some of the grid points which appear to be best solution may in fact represent simply a local minima. Thereafter, there is defined for each of the N grid points, a corresponding set $S_i$ (where i=1 . . . N) of grid points. Each set $S_i$ of grid points is comprised of P grid points overlaid on the location of one of the N grid points in accordance with a finer grid pattern. With the finer grid pattern, the P grid points are more closely spaced as compared to the grid pattern for the M grid points. This concept is illustrated in FIG. 6, which shows a finer grid pattern 600 comprised of grid points 602 arranged around the location of one grid point $500_{p, q}$.

The process continues at 318 by evaluating each set $S_i$ to determine a minimum total distance error for each of the P grid points within the set. The process then continues to 320 where a selection is made from each set $S_i$ of a particular grid point $p_i$ (where i=1 . . . P) which has a minimum total distance error which is lowest as compared to the other grid points in that set. From among these grid points which are selected from sets $S_i$, an optimum grid point $p_o$ is then selected in 322. More particularly, the optimum grid point $p_o$ is selected which has a minimum total distance error which is least among all $p_i$ grid points. By seeking the grid point corresponding to the lowest error metric value the process identifies the grid point which is the best fit or best solution to the TDOA emitter location problem among all of the $p_i$ grid points. This grid point $p_o$ can then be tested at 324 to determine whether it provides a satisfactory solution to the TDOA emitter location problem. This can involve determining in 324 whether grid point $p_o$ has a minimum total distance error which is less than a selected threshold value (which may be fixed or dynamically variable). If so (324: Yes) then the location of that particular point can be output in step 328.

Usually a grid point with an acceptable error can be determined by the time the process arrives at decision step 324. However, if the error in 324 is found to still be too large, the process can continue on to steps 325 (discussed below) and 326. In step 326 a new subset of N grid points can be selected from among the $p_i$ grid points, where the subset is again comprised of those N points which are calculated to have lowest minimum total distance error. The process then returns to 316 where new corresponding sets of grid points are defined and overlaid on the location of each of the N new grid points in accordance with a finer grid pattern. In the new finer grid pattern the P grid points are more closely spaced as compared to the grid pattern used in the previous iteration of the process. The process can continue in this manner until a grid point is located which provides a satisfactory solution at 324, and the result is output at 328.

Figure 3A:
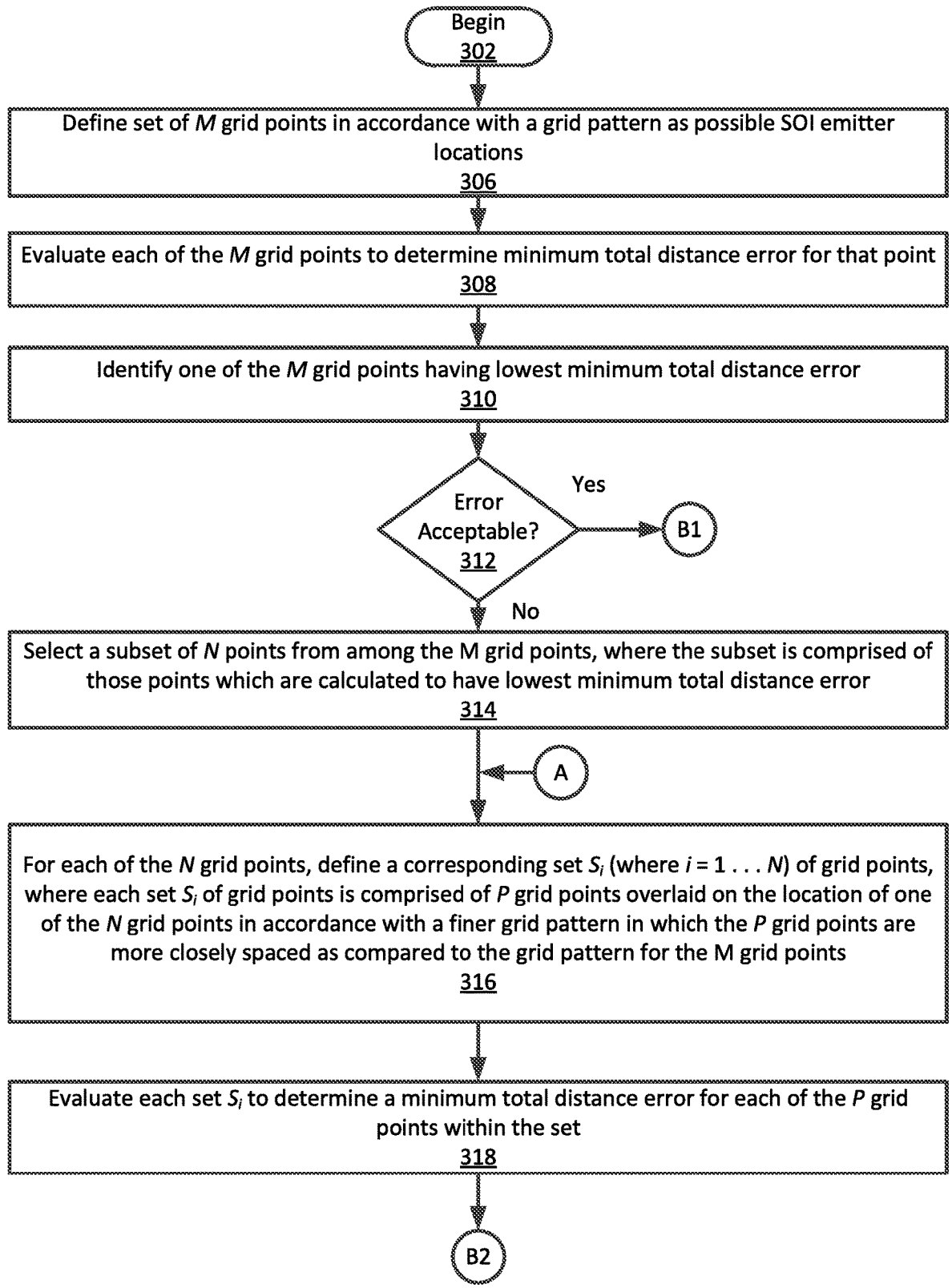
FIGS. 3A and 3B comprise a flow chart that is useful for understanding an Expanding Spherical Positioning (ESP) method for determining a location of an RF emission source.
Figure 3B:
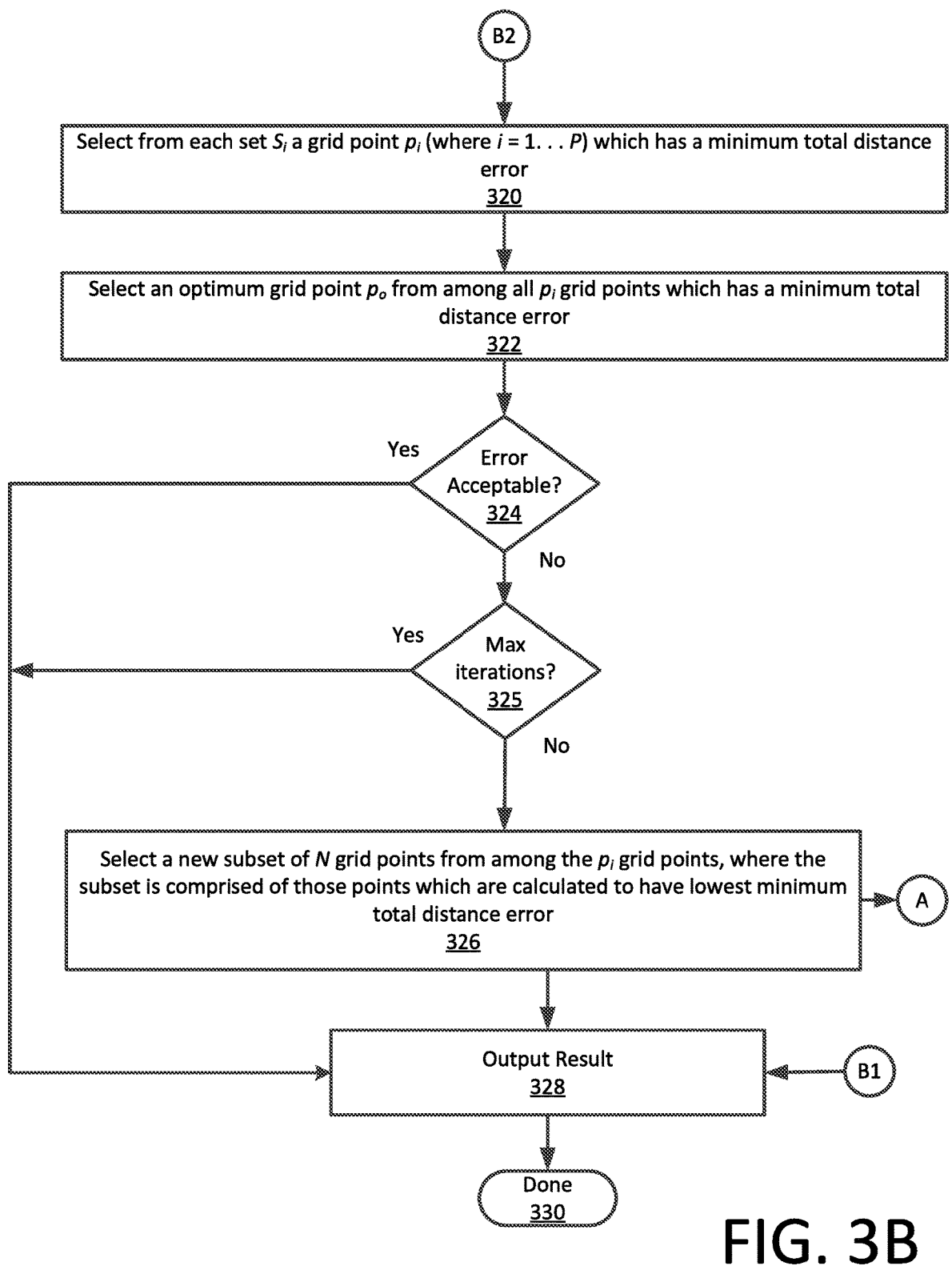

With reference to step 325, there may be some scenarios where noise or sensing errors prevent the determination of a satisfactory result even after several iterations of the process in FIGS. 3A and 3B. In those instances where the maximum number of iterations is reached (325: Yes), the process can output 328 the grid point which yields the lowest minimum total distance error. Alternatively, the process can generate an output indicating that no satisfactory solution has been determined. The process can then terminate in step 330.

Figure 4:
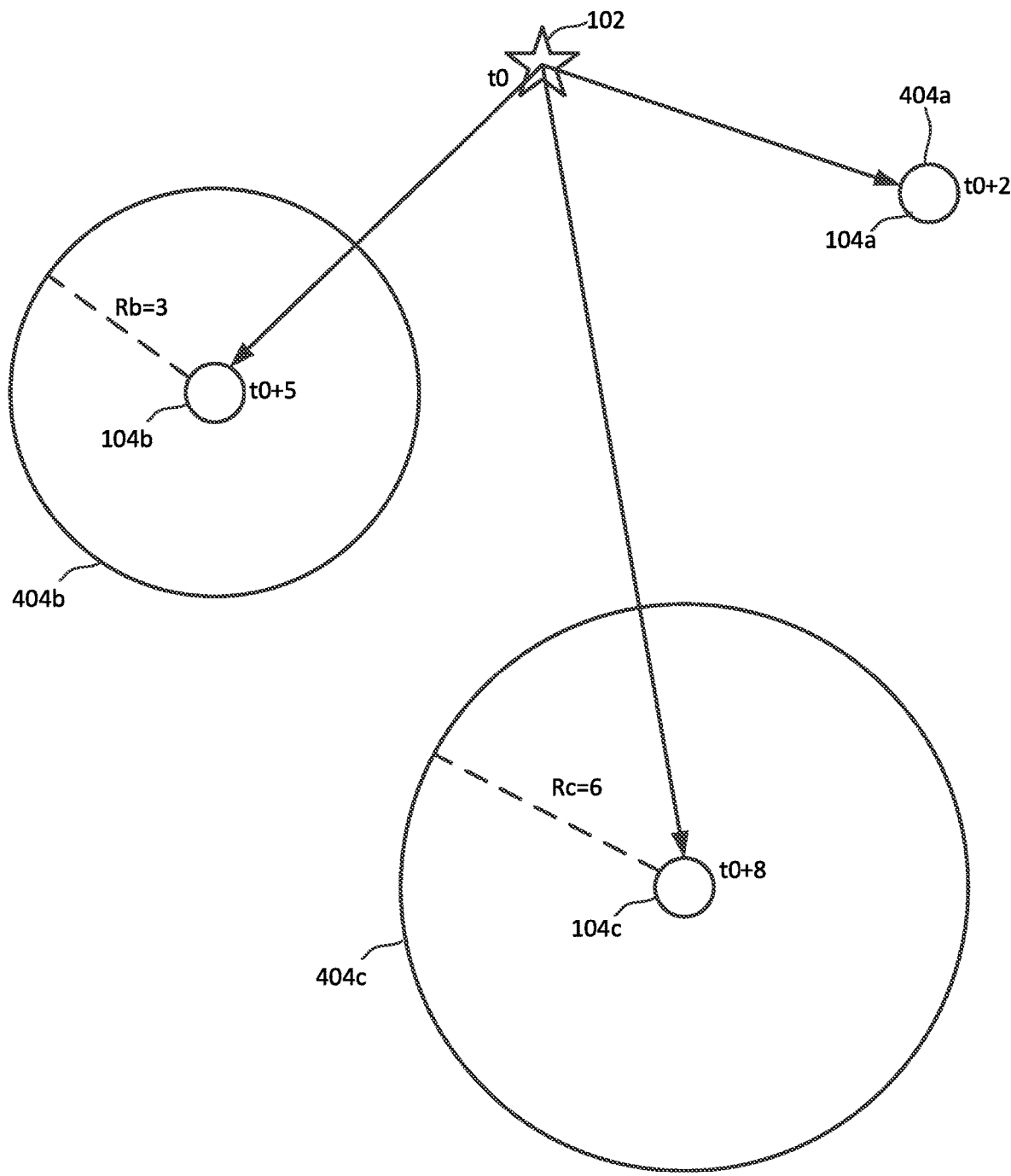
FIG. 4 is a first conceptual diagram that is useful for understanding an ESP method for determining for determining a location of an RF emission source.

The concept of a minimum total distance error will now be described in some further detail. As shown FIG. 4, circles of initial radii can be defined or drawn based on the TDOA information determined for an SOI at each detection device. The solution in FIG. 4 is described and illustrated with respect to a two-dimensional scenario. However, it should be understood that if the embodiments described herein are applied to a three-dimensional problem of transmission source location, spheres would be defined in place of the circles as described herein. To simplify the explanation, the process is described with respect to a two-dimensional solution, it being understood that a similar result can be obtained in three dimensions.

The circles of initial radii are defined based on the TDOA information determined for an SOI at each detection device. In FIG. 4, a circle 404a corresponding to detection device 104a has a radius of zero since it received the SOI earliest and is therefore assumed to be the reference node. The time difference of arrival of the SOI as between devices 104a and 104b is $T_{AB}=3$. Accordingly, circle 404b corresponding to detection device 104b is shown in FIG. 4 to have an initial radius Rb=3. The time difference of arrival of the SOI as between devices 104a and 104c is $T_{AC}=6$. Accordingly, the circle 404c corresponding to detection device 104c is shown in FIG. 4 to have an initial radius Rc=6.

Figure 7:
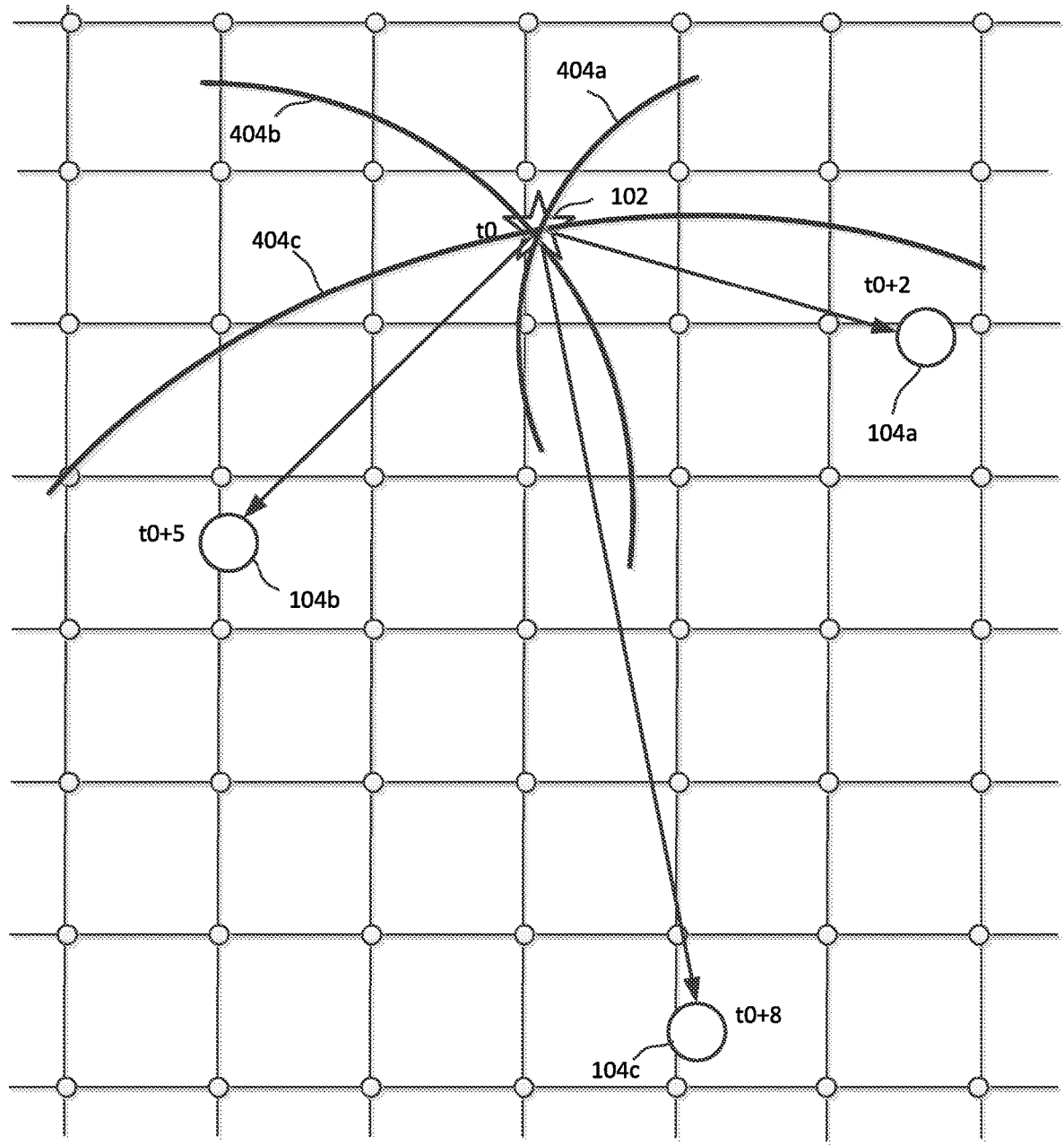
FIG. 7 is a fourth conceptual diagram that is useful for understanding an ESP method for determining for determining a location of an RF emission source.

If these circles are incrementally expanded at a uniform rate, they will eventually intersect at a location of an SOI emitter. This concept is illustrated in FIG. 7 which shows uniformly incrementally expanded circles 404a, 404b, 404c all eventually intersecting at the SOI emitter location 102 (for greater clarity in FIG. 7 only a portion of each circle 404a, 404b, 404c is shown). In such a scenario, the distance measured from the SOI emitter location 102 to the perimeter of each circle 404a, 404b, 404c would be zero in each case. Consequently, the sum of these minimum distances would also be equal to zero. So if SOI emitter location 102 exactly corresponded to a location of a grid point under test, then the minimum total distance error for that point would be zero, indicating a perfect solution to the TDOA emitter location problem.

But for grid point locations that do not exactly correspond to the location of the SOI emitter, the minimum total distance error calculated as described will be some non-zero value. Accordingly, the minimum total distance error value can function as an error metric or indicator of how well each particular grid point location serves as a solution to the TDOA emitter location problem. A process for determining minimum total distance error will now be described in further detail.

Figure 5:
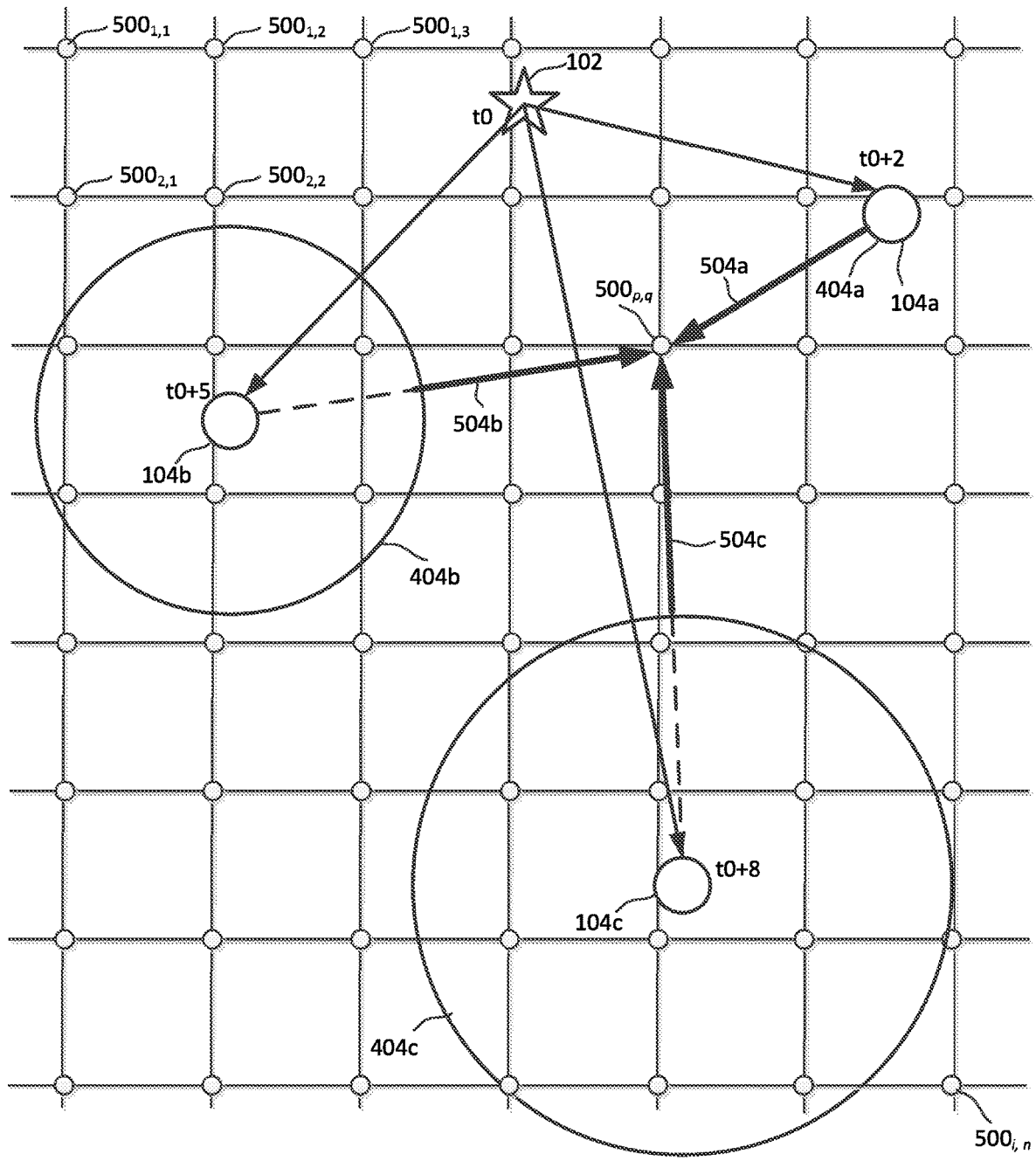
FIG. 5 is a second conceptual diagram that is useful for understanding an ESP method for determining for determining a location of an RF emission source.
Figure 8A:
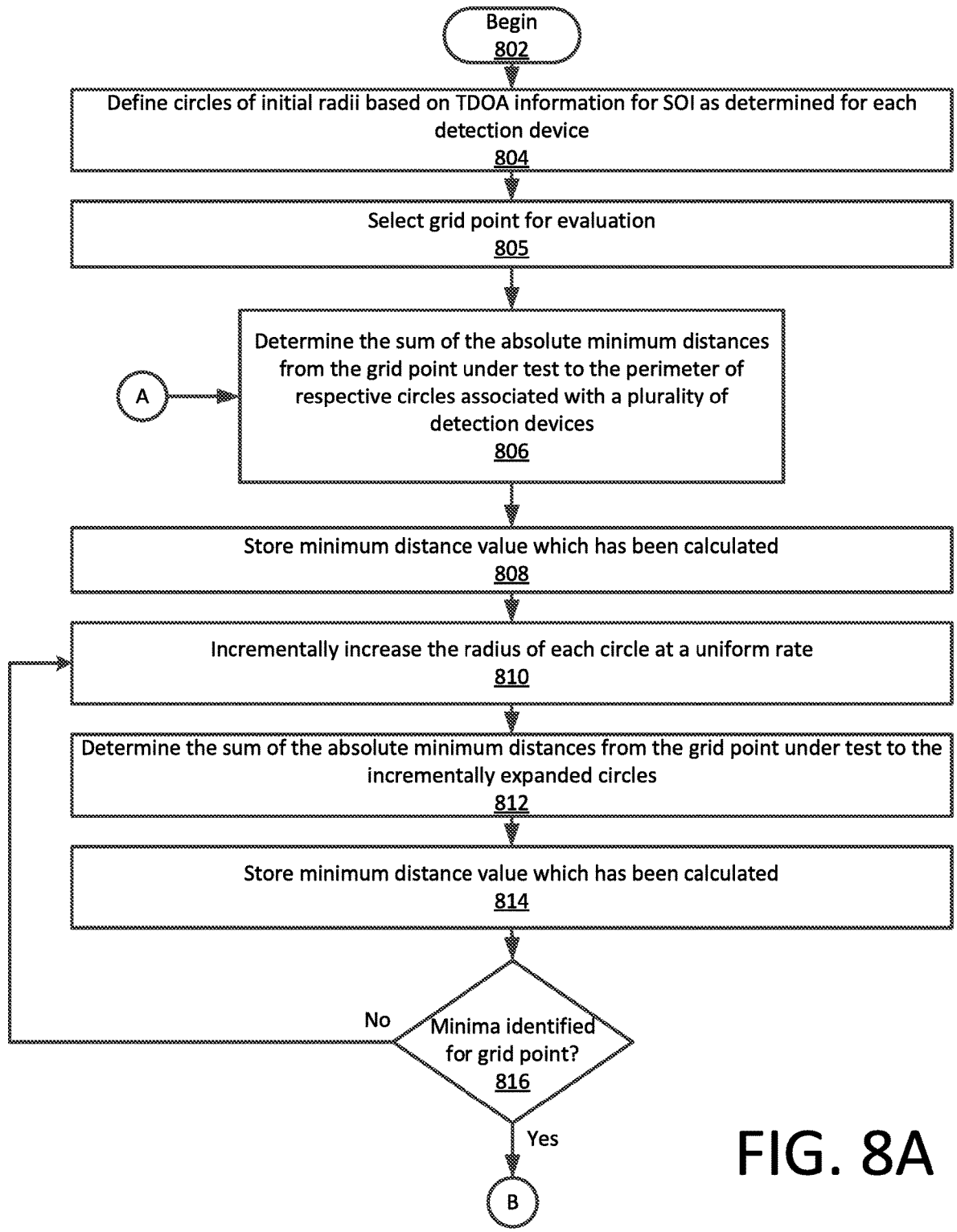
FIGS. 8A and 8B comprise a flowchart that is useful for understanding a manner in which a minimum total distance error can be calculated for a plurality of grid points under evaluation.
Figure 8B:
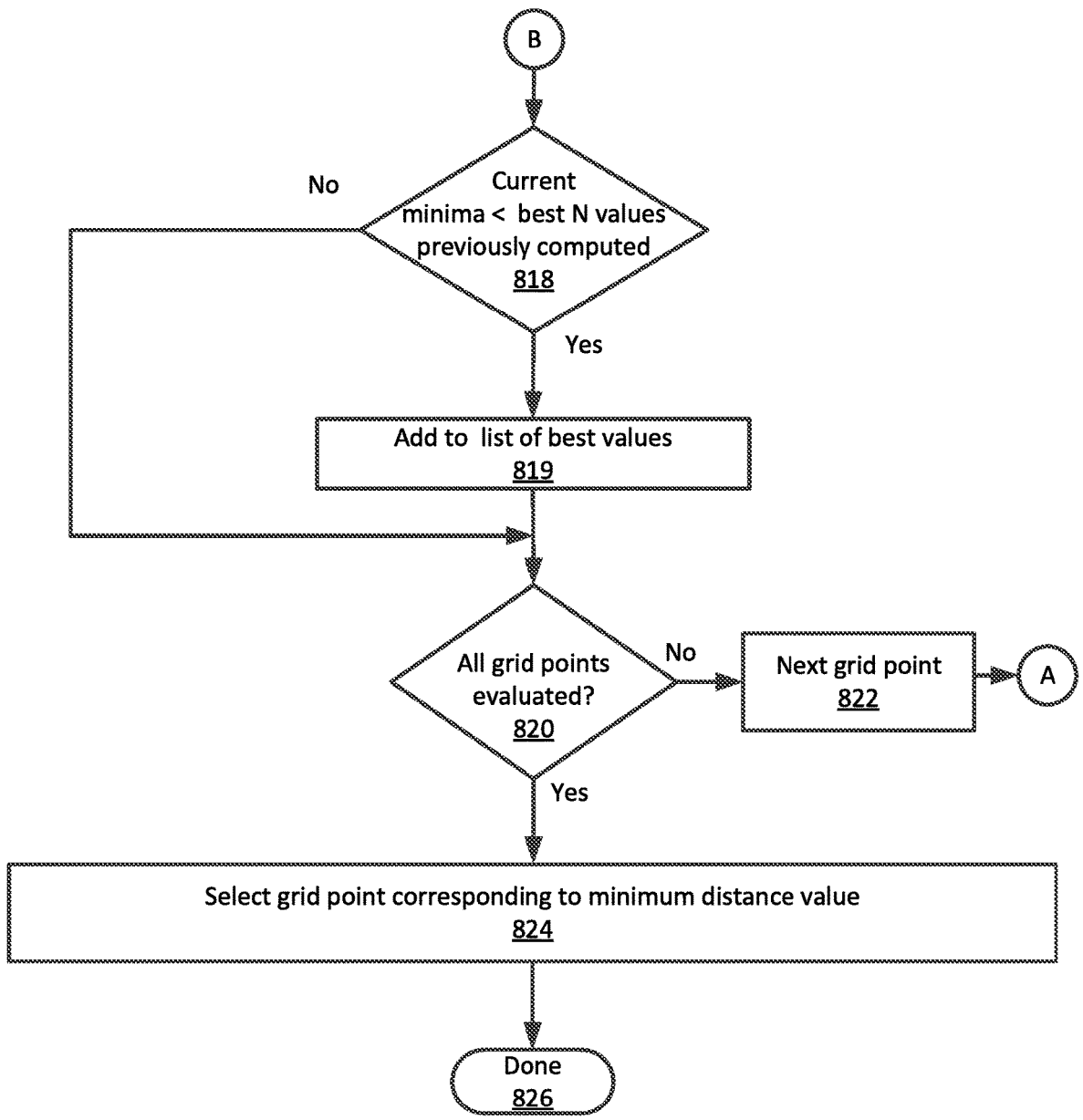

Referring now to FIGS. 8A and 8B, the process can begin at 802 and continue to step 804. At step 804 circles of initial radii (e.g., circles 404a, 404b, 404c) are defined as described above in relation to FIG. 4. The process continues at 805, where a grid point is selected for evaluation. The process then continues at 806 by determining the sum of the absolute minimum distance from the grid point under test to the perimeter of a respective circle (e.g., circles 404a, 404b, 404c) associated with a detection device 104a, 104b, and 104c. This process is illustrated in FIG. 5 with reference to a grid point $500_{p,q}$ which is under evaluation. This particular grid point has a minimum total distance $d_{p,q}$ relative to the perimeter of each circle, which is the sum of distances 504a, 504b, and 504c.

The minimum distance value calculated in 806 can thereafter be saved in step 808. The defined radius of each of the circles (e.g., circles 404a, 404b, 404c) is subsequently expanded incrementally at the same rate in step 810. The grid point under test (e.g., grid point $500_{p,q}$) is then reevaluated at 812 with each incremental increase to determine the sum of the minimum distances from that point to the perimeters of each incrementally expanded circle. The sum calculated in step 812 is then saved at 814 and the process continues to step 816.

In 816 a determination is made as to whether a minimum has been identified with respect to the sum of the minimum distances from the point under test to the perimeters of each of the incrementally expanded circles. Stated differently, the process in blocks 805-816 continues until the value of $d_{p,q}$ is minimized for the particular grid point under evaluation. If the minimum value has been detected (816: Yes) then this minimal value is selected as the minimum total distance error for the point under test. In some scenarios, this determination can comprise an evaluation as to whether the sum of the distances is less than a threshold value (which may be fixed or dynamically variable in accordance with one or more detected conditions).

If the $d_{p,q}$ minima for a point under test has been identified in 816, then the process continues to block 818 where such value is compared to the best minima values obtained for other grid points which have been tested with respect to the applicable TDOA information. More particularly, the value of $d_{p,q}$ for the grid point under test can be evaluated at 818 to determine whether the value of $d_{p,q}(i)$ for the current grid point under test is less than the N best values for $d_{p,q}$ obtained for other grid points which have been tested (where N is some integer value). If so (818: Yes), then the process continues to 819 the current value of $d_{p,q}(i)$ is added to the list of N best values and the largest value in the set is discarded from the list.

The process in in 806-819 is repeated for each grid point. Accordingly, a determination is made at 820 as to whether all grid points have been evaluated. If not, the next grid point is selected in step 822 and the process returns to 806. Once all grid points have been evaluated (820: Yes) the grid point is selected in 824 which corresponds to one of the N best values having the lowest magnitude $d_{p,q}(i)$. The process can then terminate at 826, or other processing can be performed.

The iterative process in FIG. 8 is useful for understanding a manner in which the minimum total distance error for each point under test can be determined. However, the iterative process can also be time consuming as it involves numerous steps and calculations. In this regard it should be noted that it is possible to mathematically derive a closed form expression for directly calculating an optimum radius of the circles corresponding to the minimum total distance error. Using such a closed form expression is advantageous as it can improve the efficiency of the ESP method described herein.

The first solution described herein (closed form hyperbolic equations) requires considerably less processing operations as compared to the second solution (ESP) described with respect to FIG. 3-8. Accordingly, a suitable metric must be applied to determine whether the additional processing steps associated with the second solution are necessary. This metric must be chosen so that it can be calculated very rapidly so as to quickly recognize the conditions when it is necessary to utilize the second solution method. An exemplary metric which can be used for this purpose will now be described in further detail with reference to FIG. 9.

Figure 9:
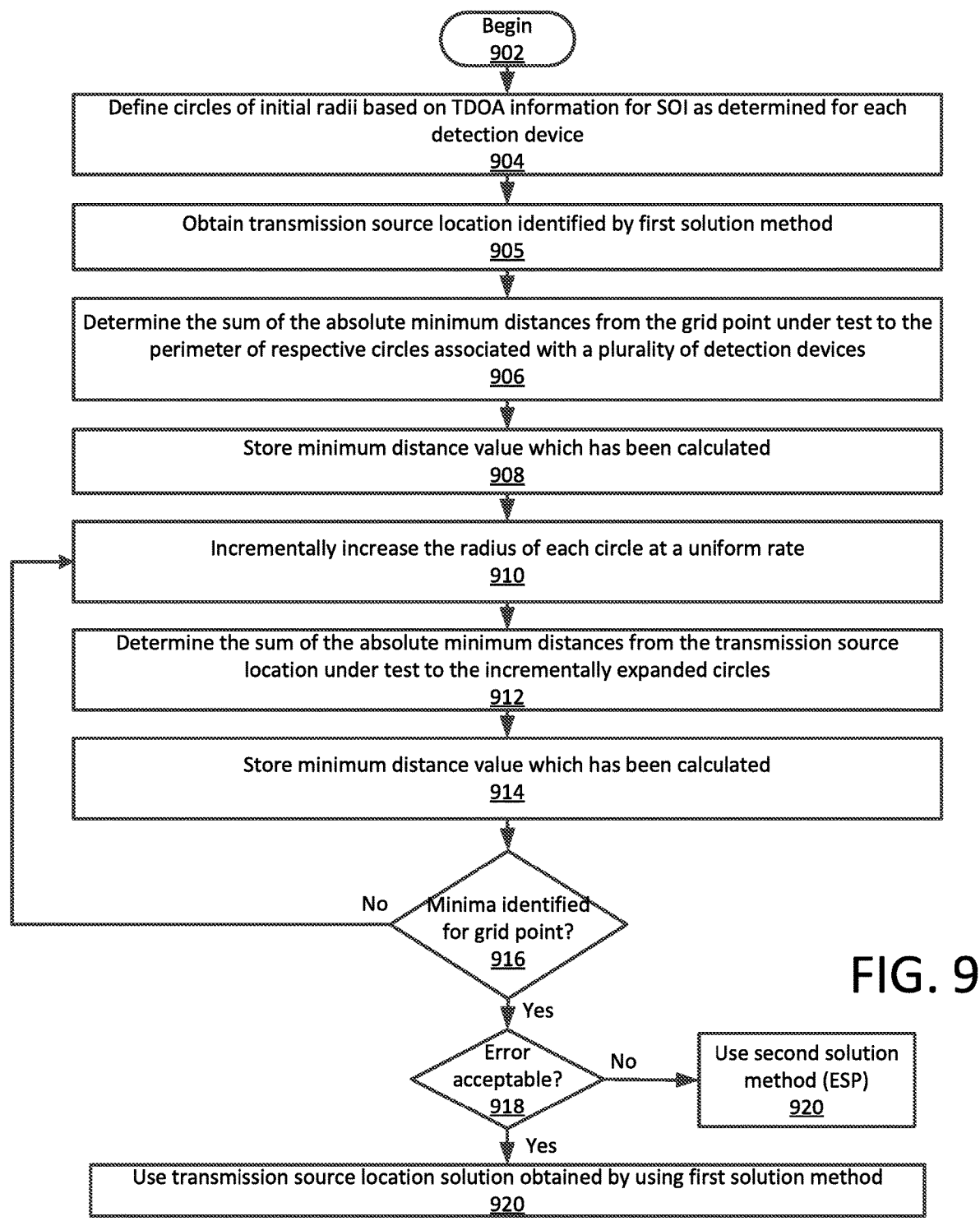
FIG. 9 is a flowchart that is useful for understanding process for evaluating whether a transmission source location solution obtained using a non-ESP solution method has produced an acceptable result.

The process in FIG. 9 is similar to certain actions performed in 805-816 of FIGS. 8A and 8B. But instead of evaluating all of the possible defined grid points to identify the transmission source location, the metric is obtained by evaluation of only a single point which has been identified by the first solution method as the location of the transmission source. So the method would begin at 902 and continue to 904 where circles of initial radii are again defined as described above in relation to FIG. 4.

The process continues at 905, where the transmission source location identified by the first solution method is retrieved from a memory location for evaluation. The transmission source location in this scenario can be thought of as one of the grid points $500_{p,q}$. The process then continues at 906 by determining the sum of the absolute minimum distance from the identified source location to the perimeter of a respective circle (e.g., circles 404a, 404b, 404c) associated with a detection device 104a, 104b, and 104c. The minimum distance value calculated in 906 can thereafter be saved in step 908.

The defined radius of each of the circles (e.g., circles 404a, 404b, 404c) is subsequently expanded incrementally at the same rate in step 910. The transmission source location solution under evaluation is then reevaluated at 912 to determine the sum of the minimum distances from that point to the perimeters of each incrementally expanded circle. The sum calculated in step 912 is saved at 914 and the process continues to step 916. Here, a determination is made as to whether a minimum has been identified with respect to the sum of the minimum distances from the source transmitter location solution point under test to the perimeters of each of the incrementally expanded circles. If not (916: No), the process returns to 910 where the circles are incrementally increased in radius. When a minimum value has been determined (916: Yes) it is used as a quality metric at 918 for the source transmission location solution which has been identified with the first solution method. If the quality metric indicates an acceptable error based on comparison with a threshold value (918: Yes) then the transmission source location identified by the first solution method is accepted at 920. If the quality metric indicates an unacceptable error, then the second solution method (ESP) is used to determine a source location solution.

Figure 10:
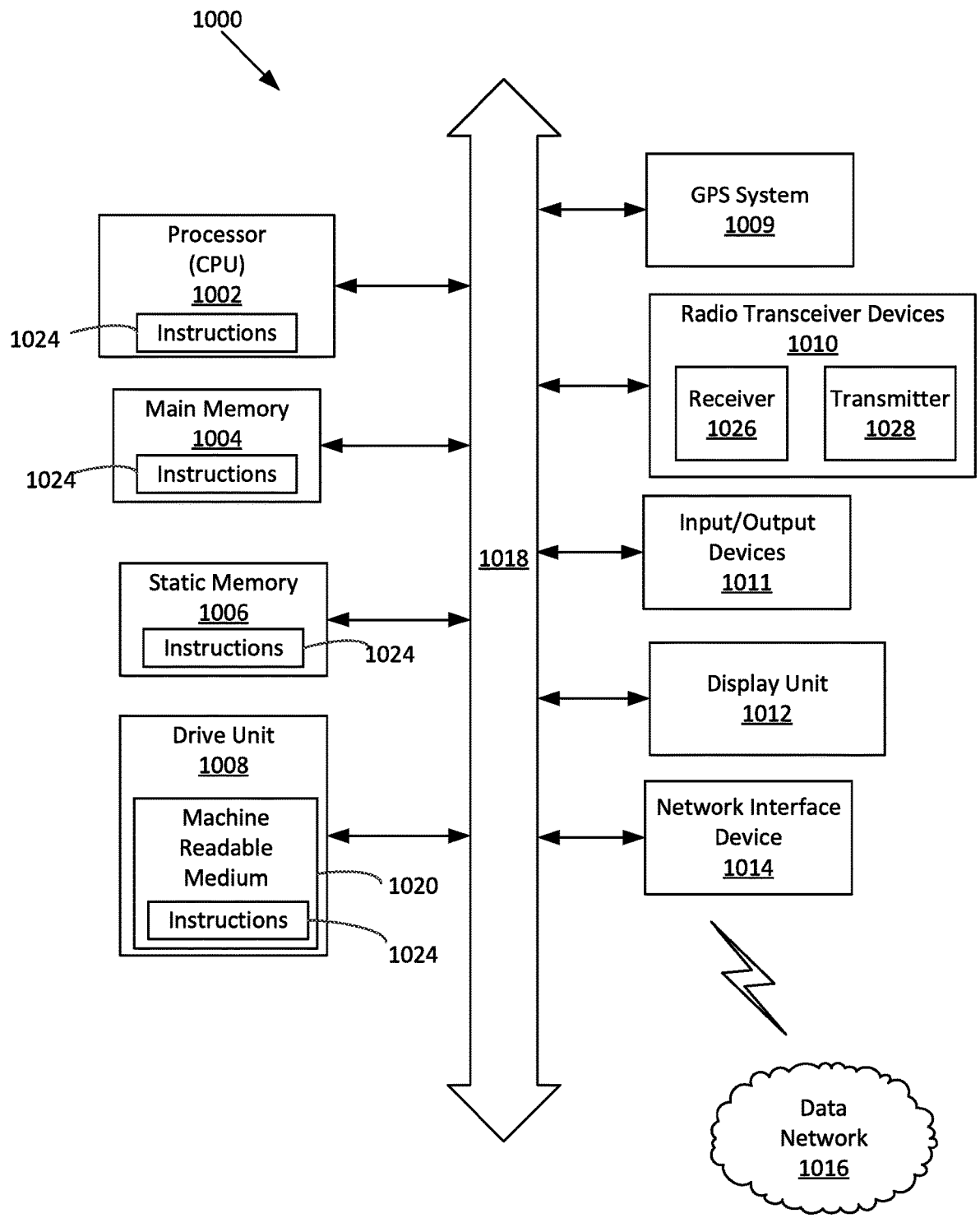
FIG. 10 is a block diagram that is useful for understanding a detection device which can be used for implementing the hybrid process in FIG. 2.

Referring now to FIG. 10 there is shown a block diagram of an exemplary detection device 1000 which can be used to facilitate the hybrid TDOA methodology described herein. The device can include a set of instructions which are used to cause the system to perform any one or more of the methodologies discussed herein. In one or more embodiments, the exemplary detection device 1000 can correspond to each of the detection devices 104a, 104b, 104c described herein. In some embodiments, the detection device 1000 can operate independently as a standalone device. However, embodiments are not limited in this regard and in other scenarios the device can be operatively connected (networked) to other devices in a distributed environment to facilitate certain operations described herein. Accordingly, while only a single device or machine is illustrated it should be understood that embodiments of the invention can be taken to involve any collection of devices that individually or jointly execute one or more sets of instructions as described herein.

The detection device 1000 is comprised of a processor 1002 (e.g., a central processing unit or CPU), a main memory 1004, a static memory 1006, a drive unit 1008 comprised of machine readable media 1020, radio transceiver devices 1010, input/output devices 1011, display unit 1012 (e.g., a liquid crystal display (LCD), a solid state display, or a cathode ray tube (CRT)) and a network interface device 1014. An optional GPS system 1009 can also be provided if necessary to serve as a time base and/or a location determining mechanism. If a GPS receiver is not used for receiving time reference signals then a highly accurate clock (such as a chip-scale atomic clock) can be used for this purpose instead. Communications among these various components can be facilitated by means of a data bus 1018. One or more sets of instructions 1024 can be stored completely or partially in one or more of the main memory 1004, static memory 1006, and drive unit 1008. The instructions can also reside within the processor 1002 during execution thereof by the processing system.

The input/output devices 1011 can include a keyboard, a mouse, a multi-touch surface (e.g. a touchscreen), a microphone, a camera and so on. The network interface device 1014 can be comprised of hardware components and software or firmware to facilitate wired or wireless network data communications in accordance with a network communication protocol utilized by a data network 1016.

The drive unit 1008 can comprise a machine readable medium 1020 on which is stored one or more sets of instructions 1024 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Detection device 1000 should be understood to be one possible example of a system or machine which can be used in connection with the various embodiments. However, the invention is not limited in this regard and any other suitable system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a machine-readable storage medium and are configured for running on a computer processor. Furthermore, software implementations can include, but are not limited to, distributed processing, component/object distributed processing, parallel processing, virtual machine processing, which can also be constructed to implement the methods described herein.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A system for determining an emitter location from which a radio frequency (RF) transmission originated, comprising:
   a plurality of detection devices distributed among a plurality of diverse geographic locations, each detection device comprising
      a radio receiver configured for receiving the RF transmission;
      a clock configured to determine a time value;
      at least one processing circuit which is arranged to record a time stamp information corresponding to a time when at least one digital data sample associated with a signal of interest (SOI) is generated at the detection device; and
      a transmitter to facilitate communicating of the at least one digital data sample and the time stamp information from two or more of the plurality of detection devices to at least one time-difference of arrival (TDOA) computer system;
   wherein the at least one TDOA computer system is configured to:

determine a TDOA information for the SOI at each of two or more of the plurality of detection devices relative to a reference one of the detection devices;

calculate a first solution based on the TDOA information to determine the emitter location in accordance with a first solution method;

determine whether or not a second solution method should be performed by evaluating the reliability of the first solution by calculating a first error metric as a sum of minimum distances from the first solution to circles associated with the plurality of detection devices, and comparing the first error metric to a performance threshold, the performance threshold having a variable value determined based on at least one measured communication condition;

if a determination is made that the second solution should not be performed, present the first solution as the emitter location to a user; and if a determination is made that the second solution method should be performed, selectively use the second solution method to obtain a second solution for the emitter location that is more accurate than the first solution for the emitter location, and present the second solution to the user;

wherein the first solution method has a faster processing speed and lower solution accuracy as compared to that of the second solution method.

2. The system according to claim 1, wherein the first solution method comprises a matrix-based solution of a set of hyperbolic equations.

3. The system according to claim 2, wherein the second solution method comprises an iterative grid-based technique, wherein a coarse set of grid points are tested to determine a second error metric associated with each said grid point, the second error metric indicating how well each grid point in the coarse set serves as a possible emitter location based on the TDOA information.

4. The system according to claim 3, wherein the iterative grid-based technique further comprises identifying a subset of N grid points from the coarse set which are the best coarse solutions based on the second error metric.

5. The system according to claim 4, wherein the iterative grid-based technique further comprises defining a corresponding set $S_i$ (where i=1 ... N) of grid points, where each set $S_i$ of grid points is comprised of P grid points overlaid on the location of one of the N grid points in accordance with a finer grid pattern in which the P grid points are more closely spaced as compared to the grid pattern for the M grid points.

6. The system according to claim 5, further comprising evaluating each set $S_i$ using said second error metric to determine from each set $S_i$ at least one of the grid points $p_i$ (where i=1 ... P) which is determined to be a best solution for that set based on the second error metric.

7. The system according to claim 1, wherein the second solution comprises a greater number of processing operations as compared to the first solution.

8. The system according to claim 1, wherein calculating the first error metric comprises an iterative method wherein the first solution is tested to determine a minimum total distance error from a set of expanding circles or spheres.

9. A process for determining an emitter location from which a radio frequency (RF) transmission originated, comprising:

receiving a signal of interest (SOI) at a plurality of detection devices distributed among a plurality of diverse geographic locations;

generating a time stamp for a plurality of digital data samples corresponding to the SOI received at each detection device based on a time of arrival of the SOI at each of the plurality of detection devices;

communicating the digital data samples and the time stamp from two or more of the plurality of detection devices to at least one time-difference of arrival (TDOA) computer system;

using the TDOA computer system to determine a TDOA of the SOI at two or more of the detection devices relative to an arrival time of the SOI at a first one of the detection devices having an earliest time stamp;

determining a first solution based on the TDOAs to determine the emitter location in accordance with a first solution method;

determining whether or not a second solution method should be performed by evaluating the reliability of the first solution by calculating a first error metric as a sum of minimum distances from the first solution to circles associated with the plurality of detection devices, and comparing the first error metric to a performance threshold, the performance threshold having a variable value determined based on at least one measured communication condition;

if a determination is made that the second solution method should not be performed, presenting the first solution as the emitter location to the user; and if a determination is made that the second solution method should be performed selectively using the second solution method to obtain a second solution for the emitter location that is more accurate than the first solution for the emitter location, and presenting the second solution to the user;

wherein the first solution method has a faster processing speed as compared to the second solution method.

10. The process according to claim 9, wherein the first solution method comprises a matrix-based solution of a set of hyperbolic equations.

11. The process according to claim 10, wherein the second solution method comprises an iterative grid-based technique, wherein a coarse set of grid points are tested to determine a second error metric associated with each said grid point, the second error metric indicating how well each grid point in the coarse set serves as a possible emitter location based on the TDOA information.

12. The process according to claim 11, wherein the iterative grid-based technique further comprises identifying a subset of N grid points from the coarse set which are the best coarse solutions based on the second error metric.

13. The process according to claim 12, wherein the iterative grid-based technique further comprises defining a corresponding set $S_i$ (where i=1 ... N) of grid points, where each set $S_i$ of grid points is comprised of P grid points overlaid on the location of one of the N grid points in accordance with a finer grid pattern in which the P grid points are more closely spaced as compared to the grid pattern for the M grid points.

14. The process according to claim 13, further comprising evaluating each set $S_i$ using said second error metric to determine from each set $S_i$ at least one of the grid points $p_i$ (where i=1 ... P) which is determined to be a best solution for that set based on the second error metric.

15. The process according to claim 9, wherein the second solution comprises a greater number of processing operations as compared to the first solution.

\* \* \* \* \*